US008908926B2

(12) United States Patent  
Henderson et al.

(10) Patent No.: US 8,908,926 B2  
(45) Date of Patent: Dec. 9, 2014

(54) METHOD OF 3D OBJECT DELINEATION FROM 3D SEISMIC DATA

(75) Inventors: Jonathan Henderson, Morpeth (GB); Steve Purves, Canary Islands (ES); James Lowell, Burnhope (GB); Dale Norton, Moorside (GB)

(73) Assignee: Foster Findlay Associates Limited, Newcastle Upon Tyne (GB)

( * ) Notice: Subject to any disclaimer, the term of this patent is extended or adjusted under 35 U.S.C. 154(b) by 111 days.

(21) Appl. No.: 13/478,317

(22) Filed: May 23, 2012

(65) Prior Publication Data

US 2012/0257796 A1 Oct. 11, 2012

Related U.S. Application Data

(63) Continuation-in-part of application No. PCT/GB2011/001780, filed on Dec. 31, 2011.

(30) Foreign Application Priority Data

Dec. 31, 2010 (GB) .................................. 1022128.1

(51) Int. Cl.
*G06K 9/00* (2006.01)
*G01V 1/32* (2006.01)
*G06T 7/00* (2006.01)

(52) U.S. Cl.
CPC ... *G06K 9/00624* (2013.01); *G06T 2207/20161* (2013.01); *G01V 1/32* (2013.01); *G06T 2207/20116* (2013.01); *G06T 7/0083* (2013.01)
USPC ....................................................... 382/109

(58) Field of Classification Search
None
See application file for complete search history.

(56) References Cited

U.S. PATENT DOCUMENTS

| 4,368,462 | A | 1/1983 | Crawley |
| 6,278,949 | B1 | 8/2001 | Alam |
| 6,438,493 | B1 | 8/2002 | West et al. |
| 6,490,528 | B2 | 12/2002 | Cheng et al. |
| 6,549,854 | B1 | 4/2003 | Malinverno et al. |
| 6,560,540 | B2 | 5/2003 | West et al. |

(Continued)

FOREIGN PATENT DOCUMENTS

WO WO-2009/126951 A2 10/2009

OTHER PUBLICATIONS

Wehland, Florian, "International Search Report" for PCT/GB2011/001780 as mailed May 10, 2012, 3 pages.

(Continued)

*Primary Examiner* — Tahmina Ansari
(74) *Attorney, Agent, or Firm* — Winstead PC (57) ABSTRACT

A method of 3D object delineation from 3D seismic data comprising the steps of, providing 3D seismic data; processing the data based on at least one characteristic whereby said characteristic is extracted from the data and compared with at least one reference characteristic and delineated based on the comparison, and defining a geological element based on the delineation. The characteristics may be adjusted. Data can be processed based on one characteristic then processed based on a second characteristic or data is processed based on two characteristics substantially simultaneously. Data may be processed n times producing n delineations from which the geological element is defined. An algorithm is provided for processing the data which may shift an evolving shape description of an object between explicit and implicit representations, where each shift applies a transformation to the object. Multiple sources of data may be utilized simultaneously to drive the delineation process.

36 Claims, 3 Drawing Sheets

(56) References Cited

U.S. PATENT DOCUMENTS

| | | |
|---|---|---|
| 7,554,883 B2 | 6/2009 | Barnes |
| 8,213,261 B2 * | 7/2012 | Imhof et al. ............... 367/38 |
| 2004/0153247 A1 | 8/2004 | Czernuszenko et al. |
| 2008/0144935 A1 * | 6/2008 | Chav et al. ............... 382/173 |
| 2008/0267499 A1 | 10/2008 | Deischinger et al. |
| 2010/0104154 A1 * | 4/2010 | Chan et al. ............... 382/128 |
| 2010/0161232 A1 * | 6/2010 | Chen et al. ............... 702/16 |
| 2010/0171740 A1 | 7/2010 | Andersen et al. |
| 2011/0115787 A1 * | 5/2011 | Kadlec ............... 345/419 |
| 2011/0188720 A1 * | 8/2011 | Narayanan et al. ........... 382/131 |
| 2012/0257796 A1 * | 10/2012 | Henderson et al. ........... 382/109 |

OTHER PUBLICATIONS

Paragios, Nikos, et al, "Geodesic Active Regions: A new framework to deal with frame partition problems in Computer Vision", Journal of Visual Communication and Image Representation, vol. 13, No. 1-2, Mar. 30, 2002, pp. 1-20.

Bose, Biswajit, "Detecting Open Surfaces in Three Dimensions", Massachusetts Institute of Technology 2009, Jun. 29, 2006, pp. 1-104.

* cited by examiner

FIG. 3

METHOD OF 3D OBJECT DELINEATION FROM 3D SEISMIC DATA

CROSS-REFERENCE TO RELATED APPLICATIONS

This patent application is a continuation-in-part patent application of and incorporates by reference the entire disclosure of International Patent Application No. PCT/GB2011/001780, which patent application was filed on Dec. 30, 2011.

TECHNICAL FIELD

A hybrid method for 3D object delineation based on segmentation methodologies.

BACKGROUND

In 3D seismic imaging and interpretation of these images, there are a number of commercial software products available for estimating the economic viability of oil and gas exploration; which help determine the viability of exploitation projects. Some of these products utilise thresholding and/or connected component analysis and/or region growing or neural network classification techniques in order to define so-called 3D Geological Elements (or "3D geobodies").

In non-seismic imaging domains more sophisticated techniques have been developed, some of which have been incorporated into commercial products, and image segmentation is still an active area of research. Two techniques with interesting properties in relation to the seismic image analysis problem are active contours and level sets.

3D geobody delineation techniques that are currently available commercially are computationally simple and unreliable due to the poor contrast and signal ambiguities that commonly occur in 3D seismic data. To overcome these problems the object delineation process needs to combine information extracted from the data with a priori knowledge gained through interaction with a human operator in real time.

Application of active contour based techniques allows this problem to be solved in part by providing a parametric surface representation of such objects of interest (an explicit object representation).

This enables topological knowledge or "constraints" to be integrated into the segmentation process thus "interpolating" the image information where it is corrupted by noise or provides an incomplete representation of an object of interest.

Level Sets (Implicit object representations) are less capable of dealing with noisy, ambiguous or low contrast data, rather than active contours; and so provide less scope for topological constraints and human operator intervention. This is in part due to their implicit nature and computational overheads. However, they can be useful when dealing with topology to changes encountered during a 3D object delineation process which would be computationally hard using explicit techniques.

SUMMARY

A method of 3D object delineation from 3D seismic data includes a) providing 3D seismic data and b) processing the data based on a first characteristic. The first characteristic is extracted from the data and compared with at least one reference characteristic so as to define a set of object data. The method also includes c) delineating the object data according to a first delineation technique, d) transforming the delineated object data using a second delineation technique so as to obtain a set of improved object data, e) extracting object data from the improved object data set, and f) repeating steps b) to e) using the extracted object data, until desired criteria are reached, so as to define a region of interest. A method for optimizing an output from a method of 3D object delineation from 3D seismic data includes (a) loading a seismic dataset into a visualisation environment operating on a computer, (b) generating at least one seismic attribute volume from said seismic dataset, (c) identifying at least one geological object from at least part of a visualization of said at least one seismic attribute volume, (d) adding at least one seed point to a representative area within said at least one identified geological object, (e) initially generating at least a first geobody from said at least one seed point in accordance with at least one predetermined seismic attribute within the vicinity of said at least one seed point, (f) adjusting at least one statistical acceptance criteria during the initial generation of at least said first geobody so as to optimize the convergence and/or equilibrium conditions of said first geobody, (g) monitoring a visually characterizing parameter during the initial generation of at least said first geobody, (h) stopping the initial generation and generating at least a first optimized geobody by manually manipulating at least part of a first surface defining at least said first geobody, and (i) exporting a dataset defining at least said first optimized geobody.

BRIEF DESCRIPTION OF THE DRAWINGS

Embodiment(s) will now be described, by way of example only, with reference to the accompanying drawings, in which.

DETAILED DESCRIPTION OF ILLUSTRATIVE EMBODIMENT(S)

According to a first aspect, there is provided an image processing and analysis technique for delineation of geological elements from 3D seismic data. Ideally the technique includes at least two 3D object delineation techniques incorporating [simultaneously] explicit and implicit representations of those 3D objects, such as: active contour and level set segmentation.

The accurate knowledge of the geometry and size of potential oil and gas reservoirs and their relationship to the surrounding geology is important in estimating the economic viability of oil and gas exploration and exploitation projects. Various embodiments are based on non-trivial extensions of both active contour and level set segmentation methodologies to create a hybrid method for 3D object delineation that has superior properties to both of the individual techniques.

Various embodiments utilise an active contour to refer to an explicit parametric surface representation.

According to another aspect, a method of 3D object delineation from 3D seismic data comprises the steps of:
a) providing 3D seismic data;
b) processing the data based on a first characteristic wherein, said first characteristic is extracted from the data and compared with at least one reference characteristic so as to define a set of object data;
c) delineating the object data according to a first delineation technique;
d) transforming the delineated object data using a second delineation technique so as to obtain a set of improved object data;
e) extracting object data from the improved object data set;

f) and repeating steps b) to e) using the extracted object data, until desired criteria are reached, so as to define a region of interest.

The object, which is typically a geological region, is therefore represented by its surface boundary, and it is the boundary that is undergoing change during the delineation process.

According to another aspect, a method of 3D object delineation from 3D seismic data comprises the steps of: providing 3D seismic data; providing an initial bounding surface; processing the data based on at least one characteristic wherein, said characteristic is extracted from the data and compared with at least one reference characteristic in order to affect a change to the bounding surface; and defining a geological element based on the bounding surface.

Alternatively, a characteristic can be extracted by processing any 3D imaging data including: electromagnetic, positron emission tomography (PET), magnetic resonance imaging (MRI), ultrasound and computed tomography scans. It is understood that the list is not limited to these techniques.

Previously decisions were based upon a single variable. The outcome was either 'yes' or 'no' and therefore such decisions were often referred to as binary decisions. This binary decision process resulted in "objects" being detected across a whole image. However, in fact pixels in an image were simply switched 'on' or 'off'. Consequently no tangible "objects" were capable of being identified by prior art systems.

Various embodiments focus on identifying tangible objects, based on a description of their boundaries. In a typical embodiment, active contour and level set representations of objects are continuously utilized in a practically simultaneous manner.

Typically a representation of an object is shifted between states in a series of small (tight lock) steps whereby the position and evolution of the boundary is determined (and continuously evaluated, as in a simulation model) by taking measurements on one, or more, image variables. These variables are referred to as characteristics.

A measurement method (such as, but not limited to, a Bayesian statistical classifier, a fuzzy classifier or fuzzy controller or in its simplest form a cost function minimising a 'distance to a threshold'), is more sophisticated than a simple threshold detection technique where the latter simply binarizes pixel values across an image to produce visible (but non-tangible) objects.

In a typical embodiment, multivariate (multi-attribute) datasets are operated on, in which each data set exhibits more than one characteristic, such as, but not limited to, multi-band colour (RGB) data sets.

Typically, the characteristics include: density, porosity, mineral content, fluid content, gas content, colour, amplitude, reflection strength, texture, intensity, energy, phase, frequency and multi-spectral attributes. However the list is not limited to these and depending on the data set other characteristics may be utilised.

Typically, the data is processed based on one characteristic to produce a delineation from which a geological element is defined.

Alternatively, the data is processed based on one characteristic to produce a first delineation and then the first delineation is processed based on a second characteristic to provide a second delineation from which a geological element is defined.

Alternatively, any number of characteristics can be used to process the data to produce a delineation and this may be achieved in a simultaneous manner or provided at substantially the same time.

Alternatively, any other sequence of characteristics and delineations can be used to produce a delineation from which a geological element is defined.

Typically, the data is processed based on multiple characteristics that are used to produce multiple delineations from which a geological element is defined.

Statistical measures of uncertainty can be obtained in relation to the geological element that is defined and in addition during the process of delineation.

In a typical embodiment data is processed based on multiple characteristics to produce multiple delineations that are used to define simultaneously a geological element and uncertainty properties for direct inclusion in a reservoir model.

Alternatively multiple delineations are provided directly to a user of the system for manual usage.

In a particularly typical embodiment data is processed n times producing n delineations from which the geological element is defined.

Alternatively, the data is processed based on two characteristics substantially simultaneously.

Alternatively, joint delineation for two or more characteristics simultaneously is used to produce delineations.

Typically, an algorithm is provided for processing the data which may be supplied from one or more databases.

In a typical embodiment, at least one characteristic is adjusted during data processing to guide the delineation process. This adjustment can be manual or controlled automatically, ideally by way of an algorithm.

Typically at least one characteristic and/or delineation is adjusted based on statistical probability either using user expertise or a data model that is accessed or by using both simultaneously.

In a typical embodiment the method comprises: an algorithm that transitions an evolving shape description of an object between explicit domain and implicit domain representations, wherein each transition applies a geometrical transformation to the object. This results in drawbacks from the use of one technique being compensated for by the other technique so as to provide a more natural representation but without the sensitivity to noise.

This 'dual domain representation' is utilised to continuously deform a geological element, through continuous processing based on characteristics and delineation, in such a way that the representation converges to a stable geometrical steady state.

This has additional features that uniquely provide the ability to: incorporate structural and spatial constraints into the process in addition to topological constraints afforded by explicit representations alone; simultaneously represent and deform multiple distinct 3D objects; implicit labelling of 3D objects for determination of connectivity; utilise multiple 3D objects in a system to fill available free space within a partially defined interpretation; and utilise these multiple 3D objects in a system for rapid definition of complete 3D earth models.

Additionally, in various embodiments, an iterative technique is included that incorporates methods for data driven evolution of an object's representation based on statistically driven and expert driven methods.

Typically, a statistically driven 'direction of least resistance' is utilised to further improve capability and performance of the technique in a number of common 3D delineation scenarios.

Typically an expert driven 'skeleton relative forces' method is utilised to provide additional expertise that is incorporated within the delineation process increasing its effectiveness in data regions where 3D seismic signal is ambiguous or signal to noise ratio is low.

Additionally, expert driven and statistically driven methods are utilised simultaneously.

Aspects of the mathematical framework also include the ability to utilise multiple sources of image information or data simultaneously to drive the object delineation process allowing various embodiments to be utilised for both conventional seismic image analysis, multi-spectral image analysis and multi-attribute image analysis within the same implementation.

It is understood that, in accordance with another aspect, there is provided a system for carrying out the method of 3D object delineation, as hereinbefore defined, the system being in communication with at least one database that stores 3D imaging data; a processor for processing the data; an output means for displaying data and an input device, such as a man machine interface that enables an operator to manipulate the system.

Typically the man machine interface that enables an operator to manipulate the system includes: a mouse and/or a keyboard and/or an electronic pen or scribing means.

According to another aspect, there is provided a[n] [interactive] method for optimizing an output from a method of 3D object delineation from [3D] seismic data. The method comprises the steps of:

(a) loading a seismic dataset into a visualisation environment operating on a computer;
(b) generating at least one seismic attribute volume from said seismic dataset;
(c) identifying at least one geological object from at least part of a visualization of said at least one seismic attribute volume;
(d) adding at least one seed point to a representative area within said at least one identified geological object;
(e) initially generating at least a first geobody from said at least one seed point in accordance with at least one predetermined seismic attribute within the vicinity of said at least one seed point;
(f) adjusting at least one statistical acceptance criteria during the initial generation of at least said first geobody so as to optimize the convergence and/or equilibrium conditions of said first geobody;
(g) monitoring a visually characterizing parameter during the initial generation of at least said first geobody;
(h) stopping the initial generation and generating at least a first optimized geobody by manually manipulating at least part of a first surface defining at least said first geobody, and
(i) exporting a dataset defining at least said first optimized geobody.

Typically, the method of 3D object delineation from [3D] seismic data is a method according to the first aspect.

A plurality of seismic attributes may be used simultaneously when executing step (e). In addition, at least two seismic attribute volumes may be visualized in a blended colour display.

The statistical acceptance criteria in step (f) may be configured to affect any one of a size, shape, position and topology of at least one said first geobody. Furthermore, the visually characterizing parameter may be a change of colour of said first surface according to any one of a quality of fit, the confidence level, its shape or extent of said first surface.

Said seed point is used to define a neighbourhood within which a greater sample of representative data can be gathered for subsequent use in generating the geobody and deforming it.

Typically, steps (e) to (h) may be executed in an iterating loop sequence. This will ensure that a maximum accuracy of the 3D representation is achieved.

Additionally, an existing image segmentation of at least said first geobody may be applied [utilized] as the seed point. Furthermore, an existing segmented region of at least said first geobody may be utilized as an initial boundary surface for at least said first geobody. Furthermore, at least one exclusion point may be added [planted] to a non-representative area within said at least one identified geological object, so as to define a statistical exclusion criteria to the generation of at least said first geobody.

Alternatively, a plurality of seed points may be interconnected so as to define at least one path adapted to guide the generation of at least said first geobody towards a predetermined direction. Typically, at least one boundary condition may be applied to any one segment of said at least one path. The at least one boundary condition may be a force adapted to guide the generation of at least said first geobody towards a predetermined direction.

Additionally, a seed point can be defined through a number of user interactions that enable larger samples of representative data to be made and included as part of the seed. Such user interactions include but are not limited to drawing of polygons and painting of regions on slices for data, or surfaces.

Additionally, any mechanism used to define a seed point may also be used to define the initial boundary of a geobody provided that is has not been used to define an exclusion criteria for a geobody.

Defining seed points through drawing of representative areas (i.e. polygons, painting or other similar methods) allow more meaningful representative data samples to be collected based on user knowledge, improving the discriminative capabilities of the system.

At least a part of an existing segmented region of at least said first geobody may be selectively locked so as to prevent any further manipulation.

In addition, at least said first geobody may be dividable from a single geobody segment into a plurality of geobody segments.

The dataset may be transformed into any one of a binarised representation within a 3D volume, at least one elevation map, or a numerical dataset including at least said statistical acceptance criteria.

Figure 1:
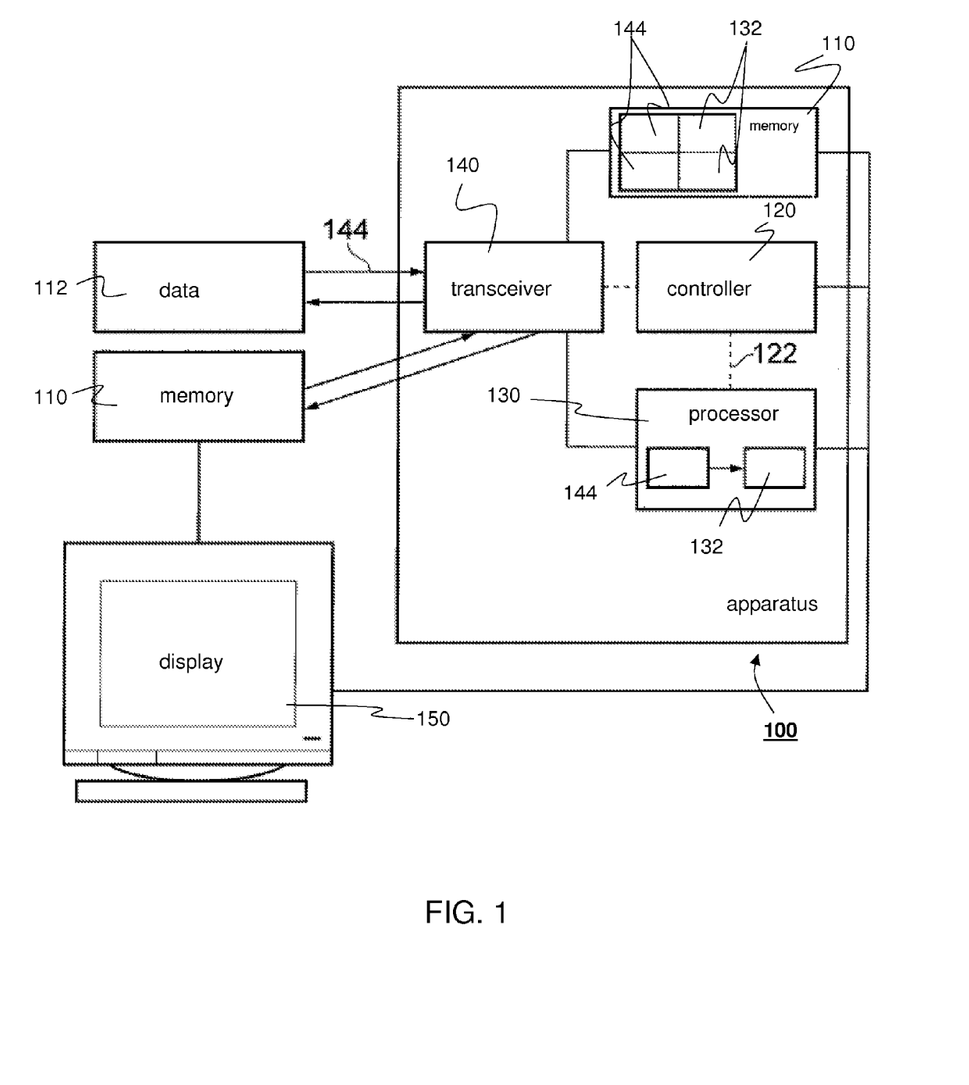
FIG. 1 is a schematic diagram showing apparatus.

Now referring to the Figures, FIG. 1 shows an overall view of a system that includes apparatus 100 used in the implementation of a first embodiment. The apparatus 100 is provided with a memory 110, a controller 120, a processor 130 and a transceiver 140 which is in communication with one or more data sources (112), such as databases.

The transceiver 140 provides data access to and from the data sources 112. The transceiver 140 is connected to the processor 130, the memory 110 and optionally the controller 120 whereby data 144 received by the transceiver 140 can be stored in the memory 110 or processed by the processor 130 on receipt.

Controller 120 may be used to decide where the data 144 is sent from the transceiver 140. The data access provided by the transceiver 140, can be one or more of a number of readily available systems such as hardwired, wireless, selective wireless etc. A person skilled in the art will appreciate the range of options available.

The memory 110 is of a size and format to at least be capable of storing one set of data received 144 from a data source 112 and typically one set of processed data 132. The memory 110 can store multiple sets of data received 144 from a source 112 and processed data 132. Alternatively or additionally, memory 110' is not housed in the apparatus 100 but is located remotely and the transceiver 140 accesses the memory 110' for uploading and downloading of data.

The processor 130 manipulates and analyses received data 144 to produce processed data 132. A display 150 is provided to output a visual representation of the data during and/or after processing and is connected to memory 110, 110' the processor 130 and optionally the controller 120.

The manipulation and analysis of the received data 144, uses an algorithm which utilises both active contour and level set segmentation methodologies either consecutively (in either order) or as a combination or switching between the two as determined by the data processing progress. This is typically all controlled 122 using the controller 120.

Figure 2:
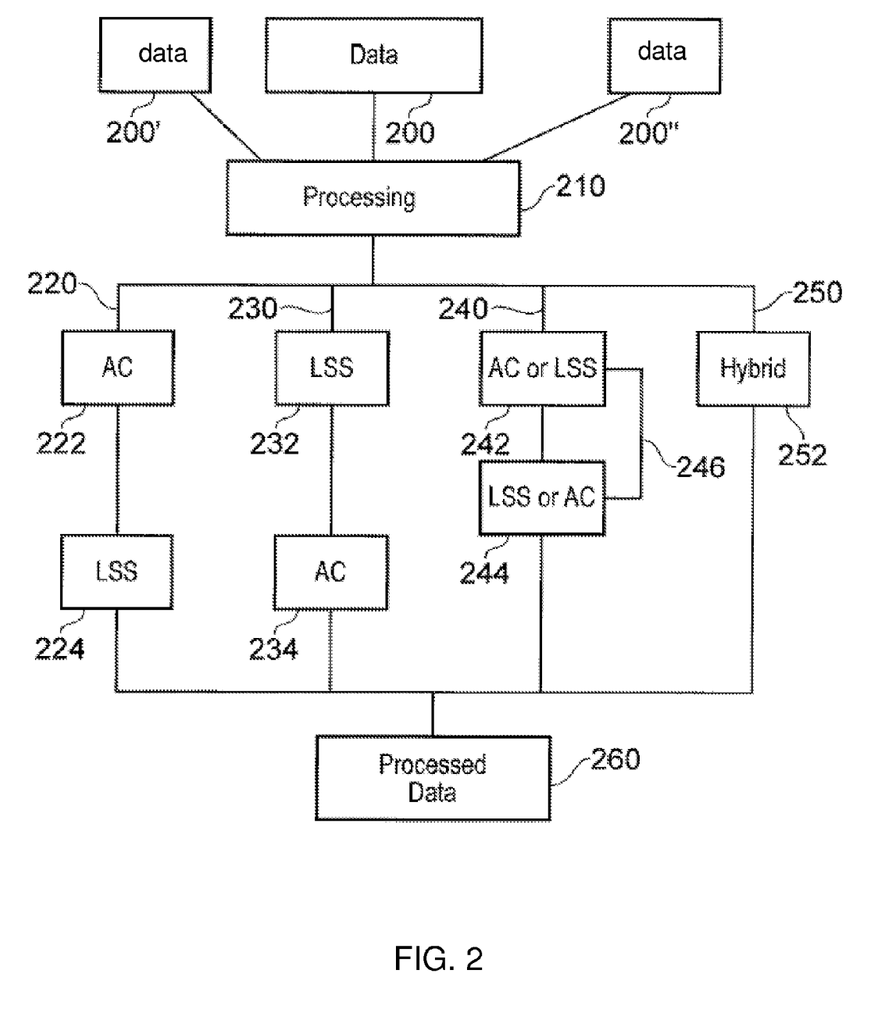
FIG. 2 is a flow diagram showing process steps.

FIG. 2 shows a flow diagram for the processing of data 200. The data 200 undergoes a processing step 210 which can take one of a number of forms and can comprise multiple steps. In a first option 220, the data 200 is processed using an active contour method (AC) 222 followed by a level set segmentation technique (LSS) 224. In a second option, the data 200 is processed using a level set segmentation technique 232 followed by an active contour method 234. A third option uses both methodologies in sequence and in either order 242, 244 then returns 246 to the first step 242 for further refinement or processing of the data. A fourth option utilises a hybrid algorithm 252 to process the data. At the end of each process stream, processed data 260 results. This processed data includes boundaries and edges from which a geological element is defined.

In every option, the processing of the data is based on characteristics; in the serial processing options, one characteristic is applied to each processing step and is selected based on the manner in which the methodology used in that processing step works. For the hybrid option the two characteristics are used substantially simultaneously.

More than one set of data 200, 200', 200" may be processed simultaneously and in the situation where the data sets are interrelated, modifications 350 made to characteristics for one set during the processing may be applied to the other set(s) to improve accuracy and processing time.

A typical embodiment and its application the different methodologies utilised will now be further explained.

The level set segmentation methodology (sometimes abbreviated as LSS) is a numerical technique for tracking interfaces and shapes and delineating data based on the difference or some other property measures on each side of the interface or boundary. It is known as an Implicit Surface based technique. The level set method permits one to perform numerical computations involving curves and surfaces on a fixed Cartesian grid without having to parameterize these objects. Also, the level set method makes it very easy to follow shapes that change topology, for example when a shape splits in two, develops holes, or the reverse of these operations.

All these make the level set method an appropriate tool for modelling objects that have a wide variety of potential topologies and geometries. The evolutionary nature of the method makes it very applicable to delineation of objects in time varying data, whether from 3D data acquired at different times, or through simulation of property changes in an arbitrary dimension.

During the process, an implicit label is assigned to every pixel in an image (or any implicit grid representation) such that pixels with the same label share certain visual characteristics. The result is a set of segments that collectively cover the entire image, or a set of contours extracted from the image. Each of the pixels in a region are similar with respect to some characteristic or computed property, such as colour, texture, intensity, energy, phase, frequency and multi-spectral attributes. Adjacent regions are significantly different with respect to the same characteristic(s).

If one takes a shape, the boundary of the shape is the zero level set of φ, while the shape itself is the set of points in the plane for which φ is positive (interior of the shape) or zero (at the boundary). As the shape is defined by two levels, it is simpler in algorithm based processing terms to work with the shape through its level set function than with the shape directly, where one would need to account for all the possible deformations the shape might undergo.

Thus, in two dimensions, the level set method amounts to representing a closed curve Γ (such as the shape in our example) using an auxiliary function φ, called the level set function. Γ is represented as the zero level set of φ by:

$$\Gamma = \{(x,y) | \phi(x,y)=0\},$$

and the level set method manipulates Γ implicitly, through the function φ. φ is assumed to take positive values inside the region delimited by the curve Γ and negative values outside.

If the curve Γ moves in the normal direction with a speed v, then the level set function φ satisfies the level set equation:

$$\frac{\partial \varphi}{\partial t} = v |\nabla \varphi|.$$

Here, |·| is the Euclidean norm and t is time. This is a partial differential equation, in particular a Hamilton-Jacobi equation, and can be solved numerically, for example by using finite differences on a Cartesian grid.

In particular, such grids can be chosen that are optimal for a particular situation in terms of grid resolution, sampling uniformity and/or multi-resolution representations.

Active Contours is a framework for delineating an object outline from a possibly noisy 3D image, based on an explicit representation of that outline. In the case of 3D objects this outline is a 2D manifold bounding surface, which may be represented by a number of different geometry types such as a triangulated mesh or non-uniform rational B-spline. This framework attempts to minimize an energy associated to the current contour as a sum of an internal and external energy.

The external energy is derived from a data measurement and is expected to be minimal when the surface is at the object boundary position. The most straightforward approach consists in giving low values when the regularised gradient around the contour position reaches its peak value. The internal energy is supposed to be minimal when the surface has a shape which is supposed to be relevant considering the shape of the sought object. Internal energy is governed by an appropriate shape model or constraint.

The most straightforward approach grants high energy to elongated contours (elastic force) and to bended/high curvature contours (rigid force), considering the shape should be as regular and smooth as possible.

Alternative embodiments include use of shape templates in order to represent more complex shape models. Methods for defining such templates include definition of a 'shape skeleton' either manually or by an algorithm, and utilising this skeleton to define directional forces that contribute to an internal force model; applying uniform internal forces that will promote expansion or contraction; and/or use of preset force models can be defined completely by construction of a preset vector force field.

In general, the surface is an energy minimizing, deformable mesh influenced by constraint (internal) and 3D data (external) forces that pull it towards object contours. A simple elastic surface is thus defined by: a set of n points; an internal elastic energy term; and an external edge based energy term.

One may visualize the surface as an initially deflated rubber balloon of arbitrary shape that is expanding & deforming with time trying to get as close as possible to the object contour. In some cases, the surface when placed near the object contour will dynamically move towards the object contour by minimizing its energy iteratively.

A surface in the image can be represented as a set of n points.

$$v_i = (x_i, y_i)$$

where i=0 . . . n−1

Its energy function can be written as $$E^*_{line/curve} = \int_0^1 E_{line/curve}(v(s))\,ds$$
$$= \int_0^1 E_{internal}(v(s)) + E_{image}(v(s)) + E_{con}(v(s))\,ds$$

$$E_{external} = E_{image} + E_{con}$$

where $E_{internal}$ represents the internal energy of the mesh surface due to bending, $E_{image}$ denotes the image forces acting on spline and $E_{con}$ serves as external constraint forces introduced by user. The combination of $E_{image}$ and $E_{con}$ can be represented as $E_{external}$, that denote the external energy acting on the mesh.

Internal Energy of the mesh is $E = E_{cont} + E_{curv}$ where $E_{cont}$ denotes the energy of the mesh contour and $E_{curv}$ denotes the energy of the mesh curvature.

$$E_{internal} = (\alpha(s)|v_s(s)|^2 + \beta(s)|v_{ss}(s)|^2)/2$$
$$= \left( \alpha(s)\left\|\frac{d\overline{v}}{ds}(s)\right\|^2 + \beta(s)\left\|\frac{d^2\overline{v}}{ds^2}(s)\right\|^2 \right)/2$$

The first-order term makes the surface act like a membrane and the second-order term makes it act like a thin plate. Large values of $\alpha(s)$ will increase the internal energy of the surface as it stretches more and more, whereas small values of $\alpha(s)$ will make the energy function insensitive to the amount of stretch. Similarly, large values of $\beta(s)$ tends to increase the internal energy of the surface as it develops more curves, whereas small values of $\beta(s)$ will make the energy function insensitive to curves in the surface. Smaller values of both $\alpha(s)$ and $\beta(s)$ places fewer constraints on the size and shape of the surface.

Alternatively, $E_{internal}$ can be derived from any combination of shape constraints or shape templates enabling the surface deformation behaviour to be optimised for extraction of different types of 3D geological objects.

Further, $E_{image}$ can be generated from three components: lines; edges; and terminations. The energies can be represented as follows:

$$E_{image} = w_{line} E_{line} + w_{edge} E_{edge} + w_{term} E_{term}$$

Adjusting the weights in the image will determine salient features in the image which will be considered by the surface.

A line functional is nothing but the intensity of the image, which can be represented as $$E_{line} = I(x,y)$$

Depending on the sign of $w_{line}$, the line will be attracted to either dark lines or light lines.

Edges in the image can be found by the following energy function which will make the surface attract towards contours with large image gradients.

$$E_{edge} = |\nabla I(x,y)|^2$$

It is rather common that a surface started far from the object converges to the desired object contour. If a part of the surface finds a low energy feature, it pulls the other parts of the surface to continue to the contour. Scale space continuation can be used in order to achieve desired results. One can allow the surface to come to equilibrium on a blurry energy edge functional and reduce the blurring as the calculation progresses. The energy functional is:

$$E_{edge} = |G_\sigma * \nabla^2 I|^2$$

Where $G_\sigma$ is a Gaussian standard deviation, σ. Minima of this functional lie on zero-crossings of $G_\sigma \nabla^2 I$ which define edges in Marr-Hildreth Theory. Thus the surface gets attracted towards zero-crossings, constrained by its own smoothness.

Curvature of level lines in a slightly smoothed image is used to detect corners and terminations in an image. Let $C(x,y) = G_\sigma * I(x,y)$ be a slightly smoothed version of the image. Let $$\theta = \arctan\left(\frac{C_y}{C_x}\right)$$

be the gradient angle.

And let $n = (\cos\theta, \sin\theta)$ and $n_\perp = (-\sin\theta, \cos\theta)$ be unit vectors along and perpendicular to the gradient direction. The termination functional of energy can be represented as $$E_{term} = \frac{\partial \theta}{\partial n_\perp} = \frac{\partial^2 C / \partial^2 n_\perp}{\partial C / \partial n} = \frac{C_{yy}C_x^2 - 2C_{xy}C_xC_y + C_{xx}C_y^2}{(C_x^2 + C_y^2)^{3/2}}$$

Additionally, external energy terms can be utilised wherever an appropriate energy functional can be formulated.

An alternative embodiment may include energy derived from a region in the vicinity of the surface $E_{region}$. Energy within regions may be determined from measurements (e.g. statistical, directional or tensor based) from regions inside, outside and/or on the surface boundary itself. Region based measurements provide additional capabilities for tracking 3D objects that have homogenous yet not necessarily uniform or simple characteristics or detecting boundaries that are not highlighted by edges or gradient changes, such as discontinuities in phase patterns or texture boundaries.

Some systems, including the original surface implementation, allow for user interaction to guide the surface, not only in initial placement but also interactively at any stage of deformation via manipulation of their energy terms. Such constraint energy $E_{con}$ can be used to interactively guide the surface towards or away from particular features.

These active contour surfaces are autonomous and self-adapting in their search for a minimal energy state. They can be easily manipulated using external image forces and handle incomplete data well. They can be made sensitive to image scale by incorporating Gaussian smoothing in the image energy function. They can be used to track dynamic objects in temporal as well as the spatial dimensions. As they reduce to a steady state they can be used to investigate the impact of changes or fluctuations in data characteristics or shape constraints.

Figure 3:
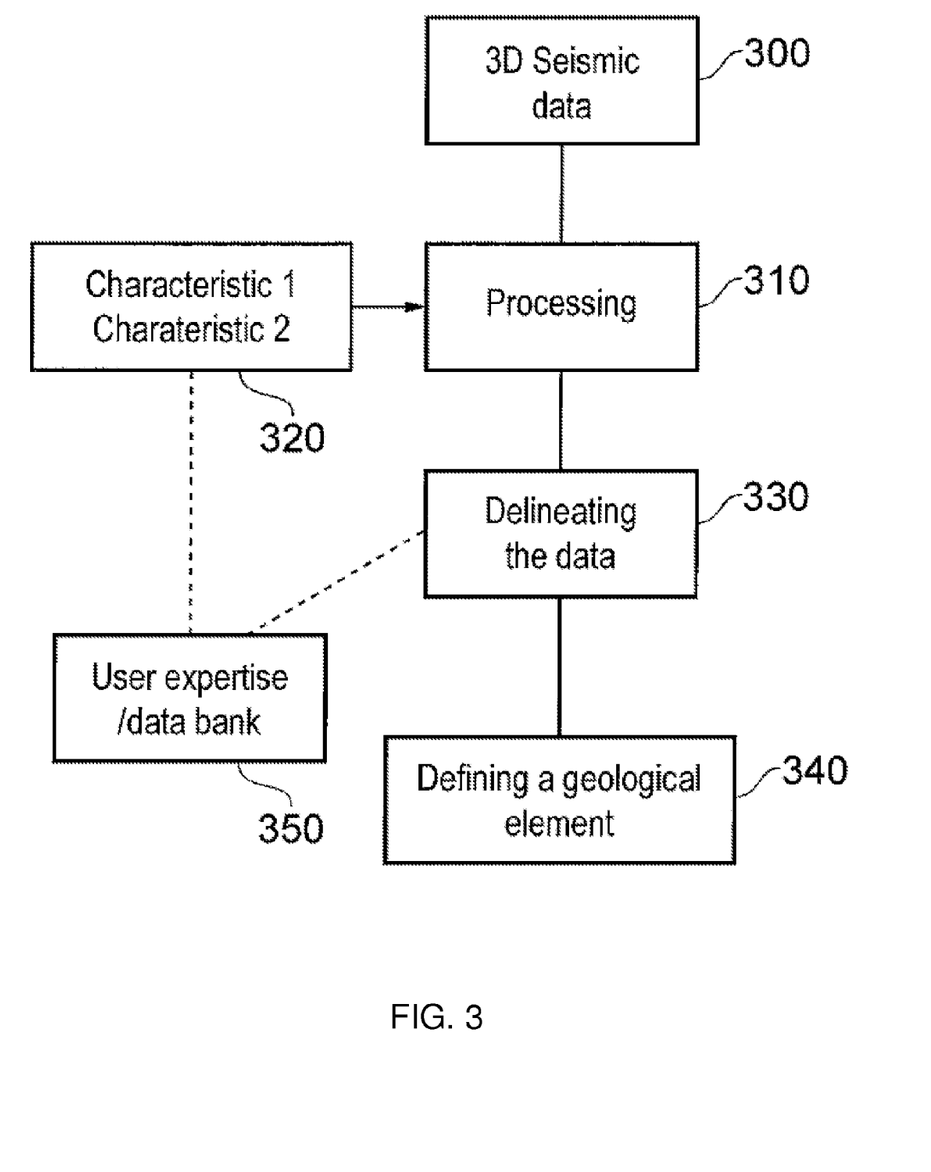
FIG. 3 is a flow diagram showing different aspects.

Referring now to FIG. 3, in one embodiment 3D seismic data 300 is provided and processed 310 based on two characteristics 320. The characteristics 320 are used in processing to segment (for LSS) and minimise the energy (for AC) of a boundary or edge to delineate the data 330. The characteristics 320 can be modified 350 during processing 310 to produce more robust and reliable delineation of the data. The modification 350 of the characteristics may be carried out manually on the basis of user experience or automatically using statistical probability. Once the data has been delineated, the boundaries or edges produced are used to define one or more geological elements 340.

It is typical that the outcome of the processing and the evolution of boundaries during processing is displayed visually as this will aid a user in the event of a manual intervention, for example to modify a characteristic.

Once the data has been processed, the information created regarding any geological elements is stored in a memory 110,110'. The data may be imaging data which is used instead of or in addition to seismic data.

A much more robust and reliable method for delineation of geological elements from 3D seismic data is provided.

It allows aspects of the geological information contained in enormous 3D seismic data sets to be extracted much more accurately and much more quickly than with existing techniques.

It forms the central element of a system in which data, a priori knowledge and operator expertise can be combined seamlessly for geological element delineation. This is not possible with current techniques.

In a typical embodiment, fundamental support is provided for the process of 3D seismic interpretation through allowing multiple 3D geobodies to be defined, to interact and to be manipulated in a way that occupies free space within a 3D subsurface interpretation.

Typically, this is achieved through the unique ability of the model based geobodies to interact with each other and with other static interpretation objects represented.

Additionally, model based geobodies can interact in an exclusive mode, whereby a deforming body collides with and deforms around a second model based geobody.

Alternatively, a deforming model based geobody can interact in exclusive mode, with multiple other model based geobodies.

Additionally, a deforming model based geobody can interact in exclusive mode with multiple static interpretation elements and multiple other model based geobodies substantially simultaneously.

Static interpretation elements, with which a model based geobody can interact, are ideally defined and represented by surfaces. Alternatively, the static interpretation elements with which a model based geobody can interact are defined and represented by 3D image data.

Typically, a single model based geobody can be deformed and interact in exclusive mode with other objects.

Alternatively, multiple model based geobodies can be deformed simultaneously and interact in exclusive mode with other geobodies and interpretation objects.

Additionally, multiple model based geobodies can be deformed simultaneously and interact competitively with other model based geobodies, whereby such interaction will cause deforming geobodies to compete over available space and the space occupied by each other.

Alternatively, multiple model based geobodies can be deformed simultaneously and interact both competitively and exclusively simultaneously dependent upon configuration by a user of the system or a suitable algorithm.

These deformation and interaction capabilities allow, for the first time, perturbation and sensitivity analysis to be carried out on potential reservoir volumetrics leading to a more complete understanding of the technical and economic risks associated with oil and gas exploration development and production.

The outputs of this process may include; optimal and extreme representations of individual 3D geological elements, segments of subsurface interpretations or entire subsurface earth models, statistical information relating to the amount of spatial variation encountered relative to known variations in characteristics, parameters of the system and/or models utilised within the geobodies themselves.

It is to be appreciated that these Figures are for illustration purposes only and other configurations are possible.

Variation may be made to the embodiments described for example an alternative system may be employed to manipulate data based upon multiple variables or characteristics, the influence of specific variables or characteristics being weighted according to one or more pre-selected criteria. A practical effect of such multiple variable systems is that changes occur and depend upon the distance between a geobody advancing front and specific characteristic locations.

The initial shape of geobodies can be initialised from a skeleton structure, consisting of at least 1 path (a piecewise linear or curvilinear line element) connecting at least two points and up to an unlimited number of arbitrarily connected or disjoint collections of paths.

Deformation of the boundary can be selectively influenced along and away from such a skeleton. The skeleton can be added to at any point during the process and can influence all subsequent deforms.

The geobody can be visualised as a "2D cut", where a 2D cut is a graphical representation of the 3D geobody with another geometry Such as but not limited to; a plane, an non-manifold 2D surface, a manifold surface, a 3D object, where the 2D cut is visualised in place of the geobody as an alternate representation. In some cases the 2D cut will be used to overlay the intersecting geometry and hence may be called a "2D overlay".

2D cuts are a partial representation of a 3D geobody and dynamically deform in the same way as the 3D representation.

Sections of the geobody can be locked or unlocked to prevent or allow deformation respectively.

Manual editing of the geobody allows splitting of a geobody into multiple parts or removal of one or more parts.

Manual editing of the geobody allows manual manipulation of the surface—dragging or stretching sections of geobody, whilst maintaining the link and so integrity of the statistical model between the boundary and data being used to drive deformation.

Manual editing can be carried out on the 2D cuts, which will affect the 3D object in its entirety.

An example of a typical interactive user workflow capable of optimizing the output of the disclosed 3D object delineation method is now described.

A 3D seismic reflectivity dataset is loaded into a 3D visualisation environment such as described in the first aspect. One or more attributes are then selected to be used in the geobody generation process, i.e. a geobody extraction process. Each individual attribute does not need to fully define the area of interest as they may be used in combination. Likewise, each attribute may define a different characteristic of the feature (such as combining Edge and Envelope attributes for channel definition).

One or more seed points, which represent the starting point for the generation/extraction process, may be placed, i.e. added or "planted", and/or a path may be defined by a number of seed points in order to bias the growth along/throughout a predetermined feature. This technique examines one or more statistics of the data within a predetermined region around the seed point in order to enable a more robust definition of the attribute signatures that define the geobody than a simple threshold based autotracking technique.

The spatial location, extent of the seed points and/or any paths defined are used to define an initial geobody surface that bounds the seed points and path elements Once the generation process has been initiated, the initial bounding surface deforms, or grows, in a data driven manner according to, for example, the probability density functions (PDF) for each volume and as sampled by each seed point. This means that where there is variation in the attribute expression of the feature, the geobody will still track this feature, because of the local seed point. The geobody therefore adapts to the change in expression of the feature.

During this process, the user may alter the deformation parameters. The geobody will adapt to the new parameters and alter the deformation interactively. The deformation process may use both internal and external forces to control the deformation. In particular, seed points may be placed in a non-representative area, i.e. "background" area, to apply an external force and prevent the generating geobody to extend into this "background" area. Seed points placed on the representative feature itself may apply an internal force to deform the generating geobody along the defined feature boundaries.

In the event the generated data does not adequately represent the actual geology that is being imaged, e.g. acquisition/processing artefacts or overburden effects (velocity pull ups etc.), it may be necessary for the user to extend or reposition, i.e. manipulate, areas of the generated geobody in order to comply with the expert knowledge of an experiences interpreter.

Any of the steps of the described user workflow may be repeated in a loop sequence as often as necessary to optimize the final output of the disclosed 3D delineation process.

RGB blends of three frequency magnitude response volumes may aid interpretation of the depositional environment and may reveal additional details of a visualized channel structure.

It is evident that the described workflow when utilizing the 3D object delineation method of the first aspect allows the user, such as an experienced interpreter, to manually adjust at least parts of the generated geobody in order to maximize the accuracy of the 3D representations of the seismic dataset. Furthermore, the user may also export the full geobody representations (e.g. as a pointset) including characterizing information, such as confidence, goodness of fit or other information derived for the model and/or seismic attributes.

Embodiment(s) have been described, with modifications and alternatives, but having read and understood this description, further embodiments and modifications will be apparent to those skilled in the art. All such embodiments and modifications are intended to fall within the scope of the present invention as defined in the accompanying claims.

The invention claimed is:

1. A method of 3D object delineation from 3D seismic data comprising the steps of:
   a) providing 3D seismic data;
   b) processing the data based on a first characteristic, wherein said first characteristic is extracted from the data and compared with at least one reference characteristic so as to define a set of object data;
   c) delineating the object data according to a first delineation technique;
   d) transforming the delineated object data using a second delineation technique so as to obtain a set of improved object data;
   e) extracting object data from the improved object data set;
   f) and repeating steps b) to e) using the extracted object data, until desired criteria are reached, so as to define a region of interest; and
   g) wherein the first delineation technique includes active contour delineation; and the second delineation technique includes level set segmentation; the region of interest being defined is a geological element.

2. The method according to claim 1 wherein, the first characteristic and the reference characteristic include color, texture, intensity, energy, phase, frequency and multi-spectral attributes.

3. The method according to claim 1 wherein, the data is processed based on one characteristic to produce a first delineation and then the first delineation is processed based on a second characteristic to provide a second delineation from which the region of interest is defined.

4. The method according to claim 1 wherein, the data is processed based on multiple characteristics that are used to produce multiple delineations.

5. The method according to claim 4 wherein, the multiple delineations are used to define simultaneously a geological element and uncertainty properties for direct inclusion in a reservoir model.

6. The method according to claim 4 wherein, the multiple delineations are provided directly to a user for manual usage.

7. The method according to claim 1 wherein, the data is processed n times producing n delineations from which the geological element is defined.

8. The method according to claim 4 wherein, the data is processed based on two characteristics substantially simultaneously.

9. The method according to claim 1 wherein, the data is processed based on one characteristic to produce a delineation from which a geological element is defined.

10. The method according to claim 1 wherein, the at least one characteristic is adjusted during data processing to guide the delineating the object data.

11. The method according to claim 10 wherein, the at least one characteristic or delineation is adjusted based on statistical probability either using user expertise or a data model that is accessed or used simultaneously.

12. The method according to claim 1 wherein, an algorithm is provided for processing the data.

13. The method according to claim 12 wherein, the algorithm transitions an evolving shape description of an object between explicit domain and implicit domain representations, where each transition applies a transformation to the object.

14. The method according to claim 1 wherein, multiple sources of data are utilized simultaneously to drive the delineating the object data.

15. The method according to claim 1 wherein, a statistically driven 'direction of least resistance' is utilized to further improve capability and performance of at least one of the first delineation technique and the second delineation technique in a number of common 3D delineation scenarios.

16. The method according to claim 1 wherein an expert driven 'skeleton relative forces' method is utilized to provide additional expertise that is incorporated within the delineation.

17. The method according to claim 16 wherein expert driven and statistically driven methods are utilized simultaneously.

18. A system comprising:
at least one database operable to store 3D imaging data; and
a computer comprising a processor and memory communicably coupled to the at least one database, wherein the processor is operable to:
process the data based on a first characteristic, wherein said first characteristic is extracted from the data and compared with at least one reference characteristic so as to define a set of object data;
delineate the object data according to a first delineation technique;
transform the delineated object data using a second delineation technique so as to obtain a set of improved object data;
extract object data from the improved object data set;
repeat the processing, the delineating, the transforming, and the extracting using the extracted object data, until desired criteria are reached, so as to define a region of interest; and
wherein the first delineation technique includes active contour delineation; and the second delineation technique includes level set segmentation; the region of interest being defined is a geological element.

19. The system of claim 18, the system comprising:
a display device operable to display object data and a region of interest; and
an input device operable to enable an operator to operate the system.

20. A method for optimizing an output from a method of 3D object delineation from 3D seismic data, the method comprising the steps of:
(a) loading a seismic dataset into a visualization environment operating on a computer;
(b) generating at least one seismic attribute volume from said seismic dataset;
(c) identifying at least one geological object from at least part of a visualization of said at least one seismic attribute volume;
(d) adding at least one seed point to a representative area within said at least one identified geological object;
(e) initially generating at least a first geo-body from said at least one seed point in accordance with at least one predetermined seismic attribute within a vicinity of said at least one seed point;
(f) adjusting at least one statistical acceptance criteria during an initial generation of at least said first geo-body so as to optimize convergence and/or equilibrium conditions of said first geo-body;
(g) monitoring a visually characterizing parameter during the initial generation of at least said first geo-body;
(h) stopping the initial generation and generating at least a first optimized geo-body by manually manipulating at least part of a first surface defining at least said first geo-body, and
(i) exporting a dataset defining at least said first optimized geo-body.

21. The method according to claim 20, wherein said method of 3D object delineation from 3D seismic data is a method according to claim 1.

22. The method according to claim 20, wherein a plurality of seismic attributes are used simultaneously when executing step (e).

23. The method according to claim 20, wherein said at least two seismic attribute volumes are visualized in a blended color display.

24. The method according to claim 20, wherein said statistical acceptance criteria in step (f) is adapted to affect any one of size, shape, position and topology of at least one said first geo-body.

25. The method according to claim 20, wherein said visually characterizing parameter is a change of color of said first surface according to any one of a quality of fit, a confidence level, its shape or extent of said first surface.

26. The method according to claim 20, wherein steps (e) to (h) are executed in an iterating loop sequence.

27. The method according to claim 20, wherein an existing image segmentation of at least said first geo-body is utilized as a seed point.

28. The method according to claim 27, wherein an existing segmented region of at least said first geo-body is utilized as an initial boundary surface for at least said first geo-body.

29. The method according to claim 20, wherein at least one exclusion point is added to a non-representative area within said at least one identified geological object, so as to define a statistical exclusion criteria for the generation of at least said first geo-body.

30. The method according to claim 20, wherein a plurality of said at least one seed point is interconnected so as to define at least one path adapted to guide the generation of at least said first geo-body towards a predetermined direction.

31. The method according to claim 30, wherein at least one boundary condition is applied to any one segment of said at least one path.

32. The method according to claim 31, wherein said at least one boundary condition is a force adapted to guide the generation of at least said first geo-body towards a predetermined direction.

33. The method according to claim 20, wherein at least a part of an existing segmented region of at least said first geo-body is selectively locked so as to prevent any further manipulation.

34. The method according to claim 20, wherein at least said first geo-body is dividable from a single geo-body segment into a plurality of geo-body segments.

35. The method according to claim 20, wherein said dataset is transformed into any one of a binarized representation within a 3D volume, at least one elevation map, pointset, or a numerical dataset including at least said statistical acceptance criteria.

36. A computer-program product comprising a non-transitory computer-usable medium having computer-readable program code embodied therein, the computer-readable program code adapted to be executed to implement a method comprising:
a) providing 3D seismic data;
b) processing the data based on a first characteristic, wherein said first characteristic is extracted from the data and compared with at least one reference characteristic so as to define a set of object data;
c) delineating the object data according to a first delineation technique;
d) transforming the delineated object data using a second delineation technique so as to obtain a set of improved object data;
e) extracting object data from the improved object data set;

f) and repeating steps b) to e) using the extracted object data, until desired criteria are reached, so as to define a region of interest; and
g) wherein the first delineation technique includes active contour delineation; and the second delineation technique includes level set segmentation; the region of interest being defined is a geological element.

* * * * *